Patented Nov. 23, 1926.

1,608,010

UNITED STATES PATENT OFFICE.

JOKICHI TAKAMINE, JR., OF PASSAIC, AND NOBUCHIKA FUJITA, OF CLIFTON, NEW JERSEY, ASSIGNORS TO TAKAMINE FERMENT COMPANY, OF NEW YORK, N. Y., A CORPORATION OF WEST VIRGINIA.

FOOD PRODUCT IN SIRUP FORM.

No Drawing.    Application filed May 2, 1923. Serial No. 636,209.

For many years sirups have been used in conjunction with food products, principally for sweetening purposes. Said sirups have been used on bread, pancakes, cakes, etc., for the sole purpose of making them more palatable. These sirups may be divided into four classes, as follows: 1, cane sugar sirups; 2, glucose sirups; 3, maple sirups; 4, molasses sirups.

These have been used separately and they have also been used in various combinations with each other.

None of these sirups has any digestive properties.

We have discovered that sirups of the above general character may be given digestive properties of great benefit to mankind in that they automatically carry on the digestion of the food products with which they are used, thus assisting in metabolism and relieving the digestive organs of the system while making available a large number of the nutritive elements in the foods themselves, without in any manner impairing the palatableness of the foods or the sirups.

Certain disadvantageous actions take place upon the mixture of certain sugars with enzymes; for example, the mixture of diastatic enzymes with glucose sirup brings about solidification of the glucose; the mixture of enzymes with cane sugar often causes crystallization.

We have discovered that a stable solution of digestive enzymes and the various sugars may be produced if a quantity of invert sugar is present. This invert sugar may be incorporated either by adding the same to the sugar enzyme solution or, in case, sucrose or cane sugar be present either in whole or in part, by inverting this sugar by any of the well known methods of sugar inversion. When the inversion is carried out in the sugar solution, the hydrolysis does not need to be carried to the point where the sucrose is completely inverted, it being sufficient if approximately 5% inverted sugar be present, this quantity having the effect of inhibiting the deposition of sugar crystals for all desirable quantities of enzymes, and for all desirable concentrations of sirup, i. e., up to 40° Bé.

In carrying out our invention, we aim to produce a product in sirup which will not deposit sugar crystals at concentrations of from 20° to 40° Baumé.

One method involving the more or less complete inversion of the sirup solution is as follows: Cane sugar for example is heated at about 100° C. in the presence of about 20% moisture and a small amount of acid, for example about .03% or .05% of lactic acid. Other acids may be used, such as acetic, citric or oxalic, and the percentage of acid may be varied considerably, depending principally upon the strength of the acid used. When the inversion of the sugar is more or less complete, a preferably, substantially pure aqueous solution of enzymes extracted from fungus growth, such as *Aspergillus oryzæ*, generally known as polyzime, is added. Such solution, however, contains a very large part of the organic salts originally present in the culture medium. If desired a combination of malt extract and pepsin may be added. The inverted sugar solution should be cooled to about 50° C., or less, before the addition of enzyme is made. The mass is then intimately mixed together and a suitable flavoring material added. Other methods of inversion may be used such as by heat and pressure alone, or by the action of enzymes alone or by acid and heat alone.

Or to any of the classes of sirup above enumerated, may be added the invert sugar previously obtained, the enzyme solution and other digestants and flavoring materials.

We have specified in the first example given enzymes extracted from fungus growth such as *Aspergillus oryzæ*, but we have obtained a satisfactory product using enzymes from other sources such as from vegetable or animal origin and combinations of the two.

However, by using enzymes from fungus growth it is possible to have present therewith certain nutritive salts such as organic calcium or magnesium phosphate compounds when the fungus has been grown upon suitable farinaceous media. As is well known, these organic combinations are vital to the sustenance of life.

The product resulting from the foregoing methods is a sirup having nutritive value and also digestive properties. The nutritive value of this product is greater than that of ordinary sirups and, in addition to its nutritive value, it has digestive properties which are not to be found in any sirup as heretofore made. The sirup will not normally crystallize nor ferment and has the property of converting starches into soluble starch, dextrins and sugars, and proteins into peptones and amino-acids.

Our methods may be varied to a considerable degree without departing from the spirit of our invention and the various temperatures and proportions given may be likewise varied to a considerable degree without departing from the spirit of our invention.

We claim—

1. A food product in sirup form having a sweet and palatable flavor and containing sugar and a stable solution of digestive enzymes.

2. A food product in sirup form having a sweet and palatable flavor and containing cane sugar and a stable solution of digestive enzymes.

3. A food product in sirup form having a sweet and palatable flavor and containing cane sugar and digestive enzymes, said cane sugar having undergone sufficient inversion to prevent deposition of sugar crystals at concentrations between 20 and 40° Bé.

4. A food product in sirup form having a sweet and palatable flavor and containing sugar and digestive enzymes comprising diastatic and proteolytic enzymes.

5. A food product in sirup form having a sweet and palatable flavor and containing sugar and digestive enzymes obtained from cultures of *Aspergillus oryzœ*.

6. A food product in sirup form having a sweet and palatable flavor and containing cane sugar and digestive enzymes obtained from cultures of *Aspergillus oryzœ*, said cane sugar having undergone sufficient inversion to prevent deposition of sugar crystals at concentrations between 20 and 40° Bé.

7. A food product in sirup form having a sweet and palatable flavor and containing sugar and digestive enzymes obtained from cultures of *Aspergillus oryzœ*, said cultures having been grown on media containing nutritive organic phosphates.

8. A food product in sirup form having a sweet and palatable flavor and containing sugar, digestive enzymes and nutritive organic phosphates.

JOKICHI TAKAMINE, Jr.
NOBUCHIKA FUJITA.